(12) United States Patent
Russell et al.

(10) Patent No.: US 7,336,463 B2
(45) Date of Patent: Feb. 26, 2008

(54) DEVICE AND METHOD FOR DIMMING SERVICE LOADS

(75) Inventors: James K. Russell, Sandy, UT (US); Walter Barnum, Salt Lake City, UT (US)

(73) Assignee: Control4 Corporation, Draper, UT (US)

( * ) Notice: Subject to any disclaimer, the term of this patent is extended or adjusted under 35 U.S.C. 154(b) by 19 days.

(21) Appl. No.: 11/223,211

(22) Filed: Sep. 9, 2005

(65) Prior Publication Data

US 2007/0057641 A1    Mar. 15, 2007

(51) Int. Cl.
  *H02H 3/08*    (2006.01)
(52) U.S. Cl. .................. 361/93.1; 361/18; 361/14; 361/42; 323/323; 323/319; 323/318; 307/36; 307/37; 307/38
(58) Field of Classification Search ............ 315/209 R, 315/224, 225, 291–297, 307, DIG. 4; 307/36–38, 307/31, 32, 114, 115, 139, 125, 126, 143, 307/154; 323/323, 319, 318, 276, 275, 346, 323/344, 343; 361/93.1, 18, 14, 42, 52
See application file for complete search history.

(56) References Cited

U.S. PATENT DOCUMENTS

| 5,530,322 | A | 6/1996 | Ference et al. |
| 5,798,581 | A | 8/1998 | Keagy et al. |
| 6,347,028 | B1 | 2/2002 | Hausman, Jr. et al. |
| 2001/0045803 | A1* | 11/2001 | Cencur ...................... 315/291 |
| 2003/0178892 | A1 | 9/2003 | Black et al. |

* cited by examiner

*Primary Examiner*—Tuyet Vo
(74) *Attorney, Agent, or Firm*—Thorpe North & Western LLP

(57) ABSTRACT

A device and method are provided for detecting and configuring a solid state dimmer when wired in series or parallel with a load powered by an alternating current (AC) input. The device can comprise a microcontroller configured to be powered by the AC input. A zero-cross detector in communication with the microcontroller is capable of detecting when an AC waveform crosses zero and generating a corresponding pulse signal when the AC waveform crosses zero. A pulse analyzer can be included and configured to determine when the zero-cross detector is generating pulses exceeding a pre-determined time length threshold that represents a serial wiring configuration.

16 Claims, 6 Drawing Sheets

AC Sine Wave

Parallel Zero Cross Pattern

AC Sine Wave

Serial Configuration
Zero Cross Pattern

DEVICE AND METHOD FOR DIMMING SERVICE LOADS

BACKGROUND

Solid-state lighting dimmers operate by essentially restricting the average current flow through a load by means of controlling the conduction of the load current through a device such a triac or some other switching semiconductor device like a Metal-Oxide Semiconductor Field-Effect Transistor (MOSFET) or Bipolar Junction Transistor (BJT). The longer the triac or switching semiconductor is allowed to conduct in each AC cycle, the more average current is provided to the load. The "off" state is when the triac is not allowed to conduct at all, but even though a light bulb will appear to be completely off in this state, there is measurable leakage current through the triac.

Some configurations of electronically controlled dimmers have included a microcontroller that may monitor the AC mains, control the triac, support wireless communications, control a relay that provides an air-gap safety function, and provide other dimmer features. This processor-controlled system works well as long as the microcontroller in the dimmer is always powered and active, meaning the dimmer is always receiving AC power. The dimmer microcontroller can receive a generally consistent power flow in cases when a neutral wire is available in the wall box in which the dimmer is installed. The availability of the neutral wire allows power to be supplied to the microcontroller and lighting load simultaneously. In other words, a parallel wiring configuration is possible when the neutral wire is available.

However, it is common to have wiring situations where a neutral wire is not available at the location where the dimmer will be installed (e.g., the wall box). In these situations, the dimmer is not powered in parallel with the hot and neutral AC wires but in series with the hot and load wires. For series connections, another type of power supply system (i.e., a load controlling and line monitoring system) is needed to power the dimmer and also properly control the load. In essence, the "load-line-powered" dimmer's power supply steals some of the current for a limited time period from the hot lead to power its own processing circuitry, while its power supply return path is actually through the load.

Of course, if this load-line-powered dimmer's power supply return path is opened for any reason, the dimmer is shut off. This is the same as if a power switch shut off the dimmer's power supply circuitry. Once the dimmer's microcontroller is shut off, the microcontroller may reset itself or otherwise operate improperly.

Another problem with the configurations described above is that manufacturers of solid-state dimmers have needed to supply two types of solid state dimmers. One type of available dimmer is capable of operating properly in a parallel wiring configuration where a neutral line exists. Alternatively, another dimmer configuration is manufactured to contain the proper circuitry to operate in series with the load and power the microcontroller using a limited portion of the AC cycles received by the dimmer. Manufacturing and stocking inventory for both types of solid state dimmers tends to add complexity to the supply chain and increase the volume of product returns.

In addition, installers of the devices in the field are in a position where they end up carrying both types of solid-state dimmers in order to be prepared to properly install dimmers regardless of whether a neutral line is available. This situation increases the number of dimmers that are carried by installers and can also increase the amount of product returns when the incorrect number of a specific dimmer type is ordered.

SUMMARY OF THE INVENTION

A device and method are provided for detecting and configuring a solid state dimmer when wired in series or parallel with a load powered by an alternating current (AC) input. The device can comprise a microcontroller configured to be powered by the AC input. A zero-cross detector in communication with the microcontroller is capable of detecting when an AC waveform crosses zero and generating a corresponding pulse signal when the AC waveform crosses zero. A pulse analyzer can be included and configured to determine when the zero-cross detector is generating pulses exceeding a pre-determined time length threshold that represents a serial wiring configuration.

DETAILED DESCRIPTION

Figure 1:
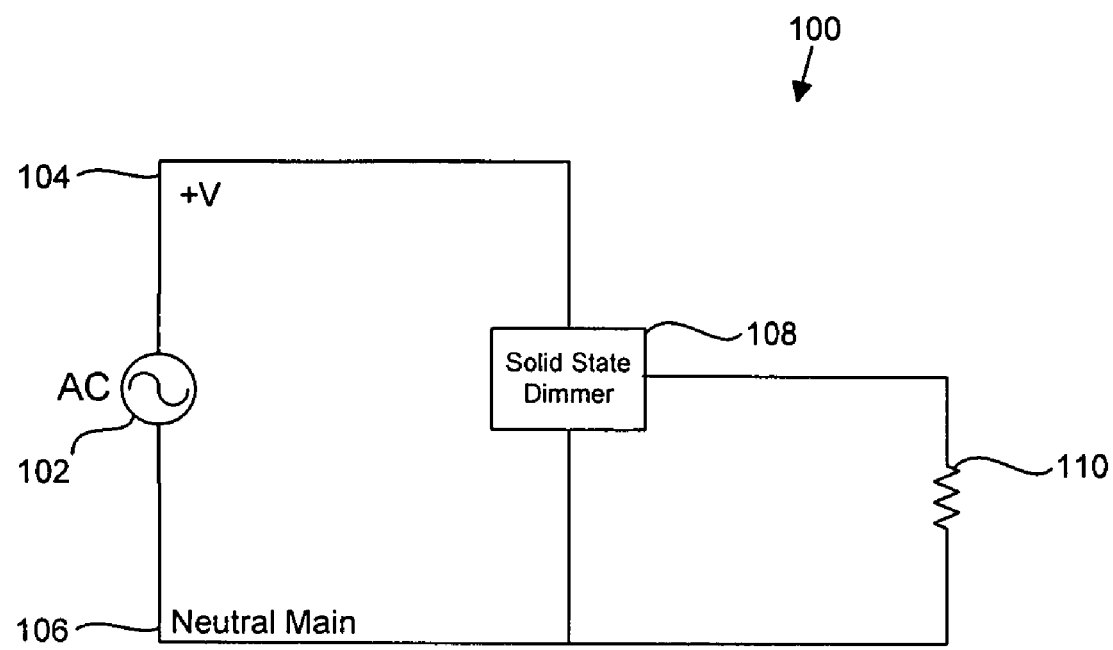
FIG. 1 is a block diagram for a dimmer device and load in parallel powered by an alternating current (AC) input in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Solid state dimmers are useful in supplying varying power outputs to a load. The solid state dimmer can be a dimmer device for dimming service loads powered by an alternating current (AC) input. Previously, solid state dimmers have generally used two separate configurations. One configuration is a parallel installation configuration where a neutral wire is available for installing the solid state dimmer. FIG. 1 illustrates a parallel configuration 100 with an AC power source 102 to supply a voltage 104 to a solid state dimmer 108. The solid state dimmer can power a resistive load 110

(i.e., a light) or some other type of load. In the parallel configuration, the solid state dimmer is typically wired to the neutral main 106. In a parallel configuration, the solid state dimmer is able to supply a load at virtually 100% of the AC power source. The availability of the neutral wire allows power to be supplied to a microcontroller and lighting load simultaneously. Previously, a separate hardware circuit or solid state dimmer configuration has been provided to enable the parallel wiring situation.

Figure 2A:
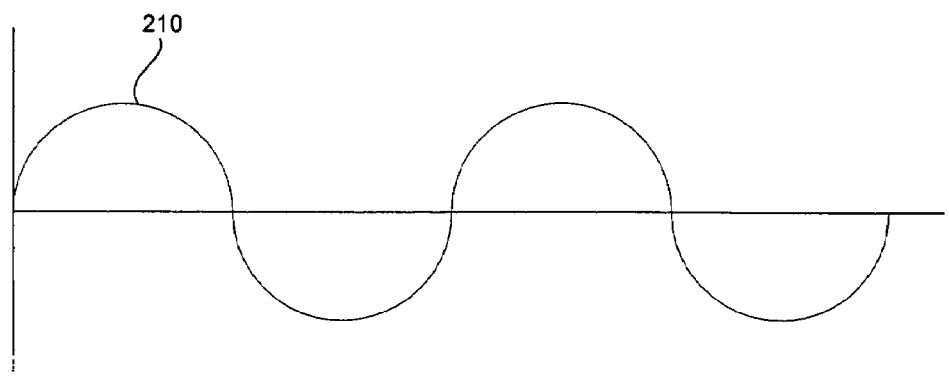
FIG. 2a is a chart of AC input over time as received by the dimmer device of FIG. 1.
Figure 2B:
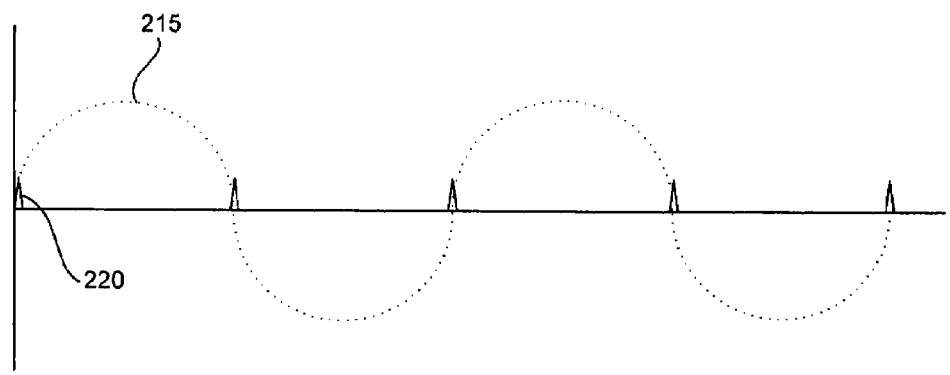
FIG. 2b is a chart of pulses from a zero cross detector as superimposed over an AC input signal as received by the dimmer device of FIG. 1.

FIG. 2a illustrates an AC sine wave 210 that is received directly from the AC signal source. The AC signal source may be 120V/60 Hz, 240V/60 Hz, 220V/50 Hz or some other voltage configuration. FIG. 2b illustrates pulses 220 from a zero cross detector coupled to the AC signal source. The pulses are the output from the zero cross detector and are illustrated as being superimposed over an AC input signal 215 which is received by the dimmer device of FIG. 1. The zero cross detector circuit generates a leading edge of a single digital pulse when the AC voltage waveform of one polarity decreases to the point that it enters a region substantially near zero volts. The falling edge of the pulse is then generated as the AC voltage waveform exits the region by increasing in voltage of the opposite polarity. Thus, a pulse is generated each time the AC voltage waveform changes sign from positive to negative or negative to positive. The width of the pulse is proportional to the length of time that the voltage detected by the zero-cross circuit stays within the small region around zero volts. As can be seen, the pulses produced by the zero cross detection of the parallel connected solid state dimmer are short spikes as the voltage crosses zero.

Figure 3:
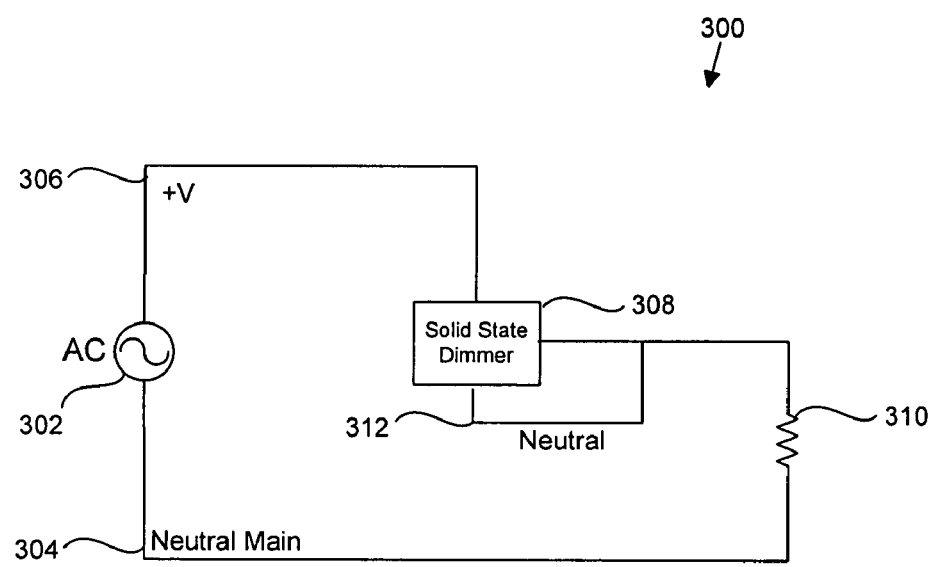
FIG. 3 is a block diagram for a dimmer device and load in a serial configuration and powered by an alternating current (AC) input in accordance with an embodiment of the present invention.

Another dimmer installation configuration illustrated in FIG. 3 is the series configuration 300 where an AC power source 302 provides a voltage 306 to a solid state dimmer 308. However, in the series configuration the neutral line 312 is connected to the line that supplies the load 310 and the neutral line does not connect to the main neutral line 304. Previously, different circuitry has been used to control and power the solid state dimmer in a series configuration. Part of the power cycle will be used to power the solid state dimmer.

Figure 4A:
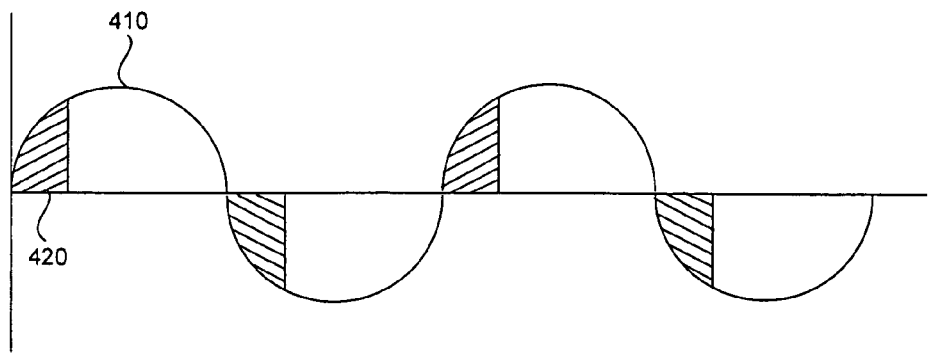
FIG. 4a is a chart of AC input over time as received by the dimmer device of FIG. 3 along with a cross-hatched area represent power used by the microprocessor.

FIG. 4a is an illustration of the AC input 410 over time as received by the solid state dimmer device of FIG. 3. The cross-hatched area 420 represents intercepted power used by the microprocessor during each cycle. This intercepted power is not used to power the load or dimmer. This limits the AC duty cycle that can be used to power the load to less than 100%. In a series configuration, the zero-cross detector is essentially detecting the load voltage waveform, rather than the incoming voltage waveform of the parallel configuration. When the load voltage is used by the microprocessor, as denoted by the cross-hatched area, then the voltage going to the solid state dimmer device is substantially near zero. The zero-cross detector can generate a pulse having a width proportional to the time the load voltage waveform is near zero. For example, the zero-cross detector may generate a pulse when the load voltage waveform is less than a predetermined amount, such as less than 0.5 volts.

Figure 4B:
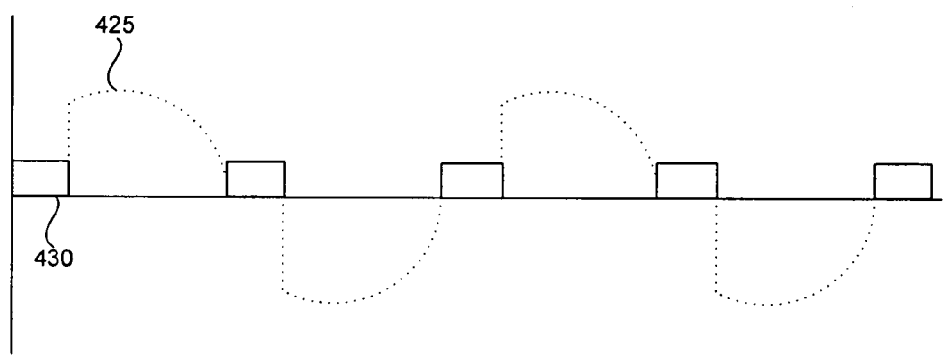
FIG. 4b is a chart of pulses from a zero cross detector as superimposed over an AC input signal as received by the dimmer device in a serial configuration as in FIG. 3.

FIG. 4b is a diagram of output pulses 430 from a zero cross detector as superimposed over the load voltage 425. The pulses form a zero cross detector duty cycle with a specific time length that can be received by the dimmer device in a serial configuration (FIG. 3). Due to the power used by the microprocessor during each cycle, the zero cross output pulses 430 have a noticeably longer time domain than the zero cross pulses 220 (FIG. 2b) in the parallel configuration. The length of the zero cross pulse is dependent on the amount of time power is intercepted to operate the microprocessor. A varying duty cycle pulse is generated in sequence with and in relation to the load duty cycle.

Figure 5:
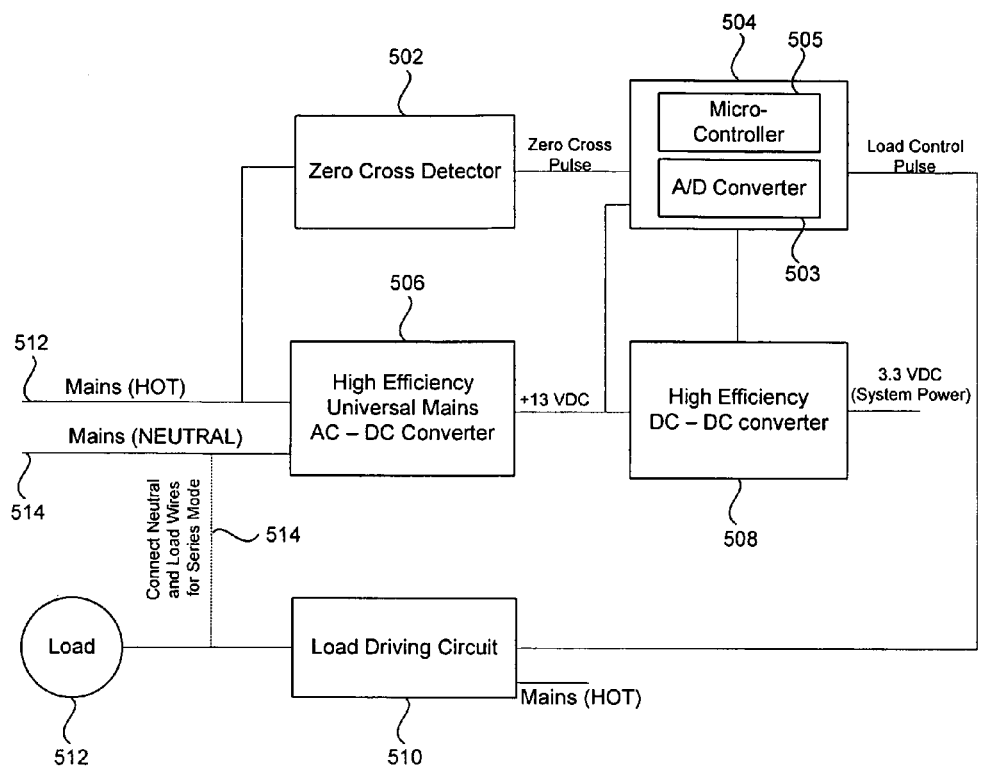
FIG. 5 is a high level block diagram of components contained in an embodiment in a dimmer device.

FIG. 5 illustrates an embodiment of the invention that includes a configuration module 504 for detecting whether a solid state dimmer is connected in a parallel or series configuration and enabling the solid state dimmer to operate correctly depending upon its configuration. The configuration module determines when the device is wired in series or parallel with a load 512 powered by an alternating current (AC) input 512 or hot main. A microcontroller 505 within the configuration module is configured to be powered by the AC input coupled to an AC-DC converter 506. The microcontroller can be any type of semiconductor device configured to receive and transmit electrical signals. A zero-cross detector 502 can output a zero cross pulse having a width proportional to the length of time that the voltage detected by the zero-cross circuit stays within the region around zero volts. The pulses from the zero cross detector are supplied to the microcontroller for analysis by firmware or software used by the microcontroller. The pulses can be measured either by the width of the pulse, or the portion of the overall duty cycle of the voltage waveform. When it is determined by the firmware or software that the duration of or duty cycle of the pulse exceeds a pre-determined time length then the microcontroller knows that a serial configuration exists. When it is determined that the duration or duty cycle of the pulse is less than the pre-determined time length then the microcontroller knows that a parallel configuration exists and a maximum amount of power can be supplied to the load.

The microcontroller 505 in the configuration module 504 can be in communication with an analog to digital converter 503. The microcontroller can be configured to operate the solid state dimmer in serial mode when the pulses exceed the pre-determined time length threshold. One way in which the microcontroller operates in serial mode is by controlling the load driving circuit 510. The load driving circuit can act as a switching power supply used to drive the load. The load driving circuit can include a switching semiconductor such as a triac, MOSFET, BJT or a similar semiconductor switch. Specifically, the microcontroller can be programmed to operate the load driving circuit on a duty cycle in serial configuration to enable to microcontroller to be powered.

The microcontroller can output a load control pulse that is sent to the load driving circuit. The load driving circuit can be connected to a power source, such as an AC power source. The load control pulse can be used by the load driving circuit to control the amount of time current from the power source is supplied to the load. The load can be driven using a switching semiconductor, in one embodiment using pulse width modulation, at a rate that allows the proper amount of power to be supplied to the microcontroller. For example, when a serial mode is detected by the microcontroller, the load driving circuit can be powered at a predetermined duty cycle. For example, the duty cycle can initially be set at 50%. The duty cycle can then be optimized to allow maximum power to the load and still maintain the minimum power to the microcontroller. The optimization typically occurs within several milliseconds, faster than is detectable by humans.

The solid state dimmer can include a high efficiency AC-DC converter 506. The converter can power a high efficiency DC-DC converter 508. The DC-DC converter can supply power to the configuration module 504, as well as system power. The analog-to-digital (A/D) converter 503 is capable of monitoring amplitude from the DC output of the AC power supply. The duty cycle for the load driving circuit can be increased from the initial duty cycle until the A/D converter reports a critical threshold has been reached in powering the microcontroller. This allows a dynamic threshold to be set depending on the load and the microcontroller being used. The load can be powered using a maximum duty cycle that enables the microcontroller to maintain a predetermined amount of power.

The A/D converter 503 can also be used in conjunction with the microcontroller to turn off power (reduce the duty cycle to zero) in the event of a blackout or brownout of the AC power supply. This can be important when a switching semiconductor is used, such as a triac, since it can easily be damaged if the proper voltage is not applied. Thus, the A/D converter can be used to set the maximum output power in a series connection as well as providing protection to the semiconductor circuits in the event of a power outage.

The solid state dimmer can be electrically coupled, either physically or wirelessly, to one or more external controllers. The external controllers can be used to alter the power supplied to a load (i.e. change the brightness of a light source). When the microcontroller detects a low power from the A/D converter then the microcontroller can report an error status of the dimmer to the one or more external controllers. The external controller can reset the electronics within the dimmer or other control system components to correct the error status, or report the error status to a user or electronic log.

Once the maximum amount of power is known for a series configuration, a user interface such as a dial or switch can be adjusted to scale between a minimum and the maximum. For example, a dial can allow a user to adjust an intensity of a load, such as a light. It can be determined that the maximum duty cycle the load can be driven at is 85% in a serial configuration. The scale of the dial can be adjusted to allow a user to adjust the power output from 0% to 85% when the dial is turned to its maximum. The load being driven by the load driving circuit can be an incandescent light, an inductive light, noble gas light, electric motor, or another electronically powered device that can use a variable power output.

A solid state dimmer can be configured to enable it to be connected in either a series or parallel configuration. The configuration module and zero cross detector can allow the dimmer to output the maximum allowable power to the load depending on the configuration. The solid state dimmer can be protected against damage from blackouts and brownouts. The dual configuration dimmer can reduce the amount of manufacturing and stock necessary to support single configuration dimmers and reduce the number of products installers have to carry.

Figure 6:
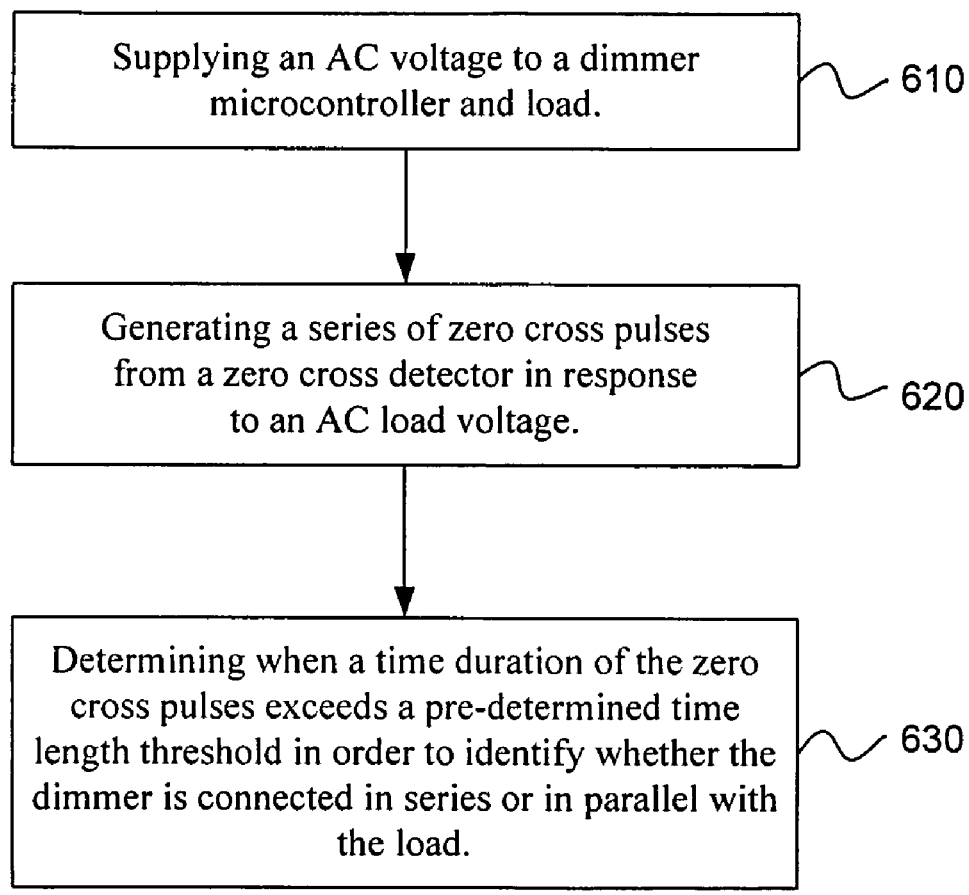
FIG. 6 is a flow chart illustrating an embodiment of an method for determining dimmer wiring configuration.

Another embodiment provides a method for determining a dimmer wiring configuration, as shown in the flow chart of FIG. 6. The method includes the operation of supplying a substantially AC voltage to a dimmer microcontroller and load, as shown in block 610. The AC voltage can be used to supply an AC to DC converter and/or a DC to DC converter to supply power to the microcontroller. A further operation involves generating a series of zero cross pulses from a zero cross detector in response to an AC load voltage, as shown in block 620. The width of the zero cross pulses can vary depending on the wiring configuration of the dimmer, as previously discussed. Another operation includes determining when a time duration of the zero cross pulses exceeds a pre-determined time length threshold in order to identify whether the dimmer is connected in series or in parallel with the load, as shown in block 630.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A device for detecting and configuring a solid state dimmer when wired in series or parallel with a load powered by an alternating current (AC) input, comprising:
    a microcontroller configured to be powered by the AC input;
    a zero-cross detector in communication with the microcontroller, the zero-cross detector configured to detect an AC waveform and produce a zero cross pulse having a width proportional to a length of time the AC waveform is near zero volts; and
    a pulse analyzer configured to determine when the zero-cross detector is generating pulses exceeding a pre-determined time length threshold that represents a serial wiring configuration.

2. A dimmer device as in claim 1, wherein the pulse analyzer is a firmware detection module.

3. A dimmer device as in claim 1, further comprising switching semiconductor device mode power device, controlled by the microcontroller, configured to supply switched power to a load.

4. A dimmer device as in claim 1, wherein the load is a lighting load to be controlled by the microcontroller.

5. A dimmer device as in claim 1, wherein the pulses generated by the zero-cross detector are a pulse signal that is a duty cycle signal.

6. A dimmer device as in claim 1, further comprising a power supply configured for supplying power to the microcontroller.

7. A dimmer device as in claim 1, further comprising a configuration module in communication with the microcontroller, the configuration module being capable of directing the microcontroller to operate in serial mode when the pulses exceed the pre-determined time length threshold.

8. A dimmer device as in claim 7, wherein the configuration module is configured to instruct the microcontroller to operate on a duty cycle in serial configuration to enable to microcontroller to be powered.

9. A dimmer device for dimming a service load powered by an alternating current (AC) input, comprising:
    a dimmer microcontroller;
    a zero-cross detector in communication with the dimmer microcontroller, the zero-cross detector configured to detect an AC waveform and produce a zero cross pulse having a width proportional to a length of time the AC waveform is near zero volts;
    a duty cycle analyzer configured to receive duty cycle signals from the zero-cross detector and determine when the zero-cross detector is generating duty cycles exceeding a time length threshold that represents a serial wiring configuration; and
    a configuration module in communication with the dimmer microcontroller, the configuration module being capable of directing the dimmer microcontroller to operate in series mode when the duty cycles exceed the time length threshold.

10. A dimmer device as in claim 9, wherein the duty cycle analyzer is a firmware detection module.

11. A dimmer device as in claim 9, wherein the service load is a semiconductor device.

12. A dimmer device as in claim 9, wherein the service load is a semiconductor device.

13. A dimmer device as in claim 9, further comprising a switching semiconductor device in communication with the dimmer microcontroller.

14. A dimmer device as in claim 13, wherein the dimmer microcontroller includes a duty cycle in serial configuration to enable the dimmer microcontroller to be powered.

15. A dimmer device as in claim 9, further comprising a lighting load to the dimmer microcontroller.

16. A dimmer device as in claim 15, further comprising a DC output of an AC to DC converter coupled to the AC input.

* * * * *